Aug. 15, 1939.     H. M. EVJEN     2,169,685

ELECTRICAL METHOD OF GEOPHYSICAL EXPLORATION

Filed June 8, 1937     2 Sheets-Sheet 1

Inventor: Haakon Muus Evjen
By his Attorney:

Aug. 15, 1939.   H. M. EVJEN   2,169,685
ELECTRICAL METHOD OF GEOPHYSICAL EXPLORATION
Filed June 8, 1937   2 Sheets-Sheet 2

Inventor: Haakon Muus Evjen
By his Attorney:

Patented Aug. 15, 1939

2,169,685

UNITED STATES PATENT OFFICE 2,169,685

ELECTRICAL METHOD OF GEOPHYSICAL EXPLORATION

Haakon Muus Evjen, Houston, Tex., assignor to Shell Development Company, San Francisco, Calif., a corporation of Delaware Application June 8, 1937, Serial No. 147,060

11 Claims. (Cl. 175—182)

This invention pertains to electrical methods for determining the presence of oil or other valuable deposits in the ground, and relates more specifically to a method for measuring the field or the potential differences generated at various points in the ground when a plurality of electrical streams is caused to flow through the ground, and the frequency, the total or relative intensity of these streams, and their distribution in the ground is varied.

In exploring the ground by electrical methods, use is commonly made of energizing or exciter circuits, by means of which current is sent into the ground, or induced in the ground, for example, by means of current electrodes in contact therewith, or by means of insulated loops placed on the surface and carrying an alternating current. The field, or the potential difference generated by such ground currents is determined and recorded by means of suitable apparatus connected between suitably placed potential or exploring electrodes or loops, and gives valuable indications as to the nature and peculiar characteristics of the ground under exploration.

The practical application of electrical methods for purposes of geophysical exploration meets, however, with many difficulties.

In the first place, these methods are handicapped by the fact that the effects of different minerals and structures on the measured electrical quantities are superimposed on a primary effect which is normally present even when the ground is perfectly homogeneous and uniform. This relatively large normal effect masks the effects of the minerals and structures under investigation, detracts from the dependability and accuracy of the measurements, and generally results in a lack of sharpness in the curves obtained. Although electrical exploration methods are essentially concerned only with effects due to departures from perfect uniformity and homogeneity of the ground, it has heretofore been necessary to measure the sum of effects due to both the uniform and the non-uniform properties of ground formations, and to analyze in detail relatively small variations in the measured quantities in order to arrive, often only after complicated calculations, at the nature of the departure from the uniformity of the ground.

In the second place, conventional methods of electric exploration, under given conditions of frequency and intensity of current, do not provide any means for controlling the distribution of the exploring current and its penetration into the ground, except by varying the arrangement and spread of the current electrodes. Moving the electrodes around entails time-consuming labor in the field. Moreover, when an electrode is moved from one location to another, local electric properties in the ground are apt to change radically, thereby introducing errors which are hard to eliminate from the measurements. Furthermore, the depths to which the results of these measurements refer are generally vaguely defined. Since the ground usually comprises a plurality of layers lying at different depths and having different electrical properties, and since each of these layers forms, in conducting the current between grounded current electrodes a circuit branch placed in parallel with branches formed by other layers, the observed electrical effects may be considered as the result of an integration from the surface of the earth to its center. Any kind of resolution of effects which it is at all possible to obtain is due to the fact that during the process of integration more is contributed towards the total result by certain layers than by others. The observed apparent resistivity, for example, may therefore be considered as a weighted average of the resistivities of the strata overlying each other, more relative weight being given to one depth than to others. Heretofore the operator, having no control over the penetration of the current into the ground, except, as mentioned, by varying his arrangement and spread of electrodes, had no control over these relative weights.

It is the object of the present invention to provide a method for controlling the density and effective distribution of the current in the ground by making use of a plurality of parallel energizing or exciter circuits, that is, by connecting to the same source of electromotive force either a plurality of current electrodes in contact with the ground, or a plurality of current carrying loops insulated from the ground, and by regulating the relative amounts of current passed through the different electrodes, or through the various loops. The manner in which this may be effected has already been generally disclosed in my co-pending application, Serial Number 133,804, filed March 30, 1937, of which this is a continuation-in-part. The present invention is more specifically concerned with the measurement of potentials derived from the ground currents as a function of the ratio of the currents passed through a plurality of parallel energizing or exciter circuits. By properly adjusting the relative proportions of the current fed into the various branches, generating the ground currents, it becomes possible, according to this invention, to increase the relative weight given to a certain depth with regard to others, so that the depth to which the measurements refer becomes more sharply defined.

It is another object of the present invention to provide a method for a direct measurement of the effects of departures from uniformity in the ground, whereby the normal effect of a uniform ground is eliminated, and it becomes unnecessary to base the interpretation of results on relatively small variations of the total measured quantity.

It is another object of the present invention to provide a method of measurement whereby the effects arising from changes in the electrical properties of the ground in a horizontal direction, as exemplified by faults and dips, are separated from effects arising from changes in the electrical properties of the ground in a vertical direction, as exemplified by layered formations.

It is another object of the present invention to provide a method for effectively eliminating, by averaging out, the effect of shallow electric anomalies in the ground immediately adjoining the different electrodes by the use of a symmetrical arrangement of electrodes which makes it possible to interchange the electrodes and to repeat a series of measurements with a different arrangement of electrodes in the circuit without actually moving the electrodes.

It is another object of this invention to provide a method of electrical exploration comprising only so-called null measurements, the unsurpassed accuracy of which is generally recognized.

The nature of the present invention in its various embodiments will appear more clearly from the following description taken in connection with the attached drawings, wherein:

Fig. 1 illustrates diagrammatically the arrangement of apparatus whereby a plurality of current streams may be passed in the ground through a plurality of current electrodes, or induced therein by means of a plurality of current-carrying loops, the potential difference generated by these currents between various points in the ground being determined by balancing it against the potential drop created when an ascertainable fraction of the total current is passed through a known resistance.

Figure 1:
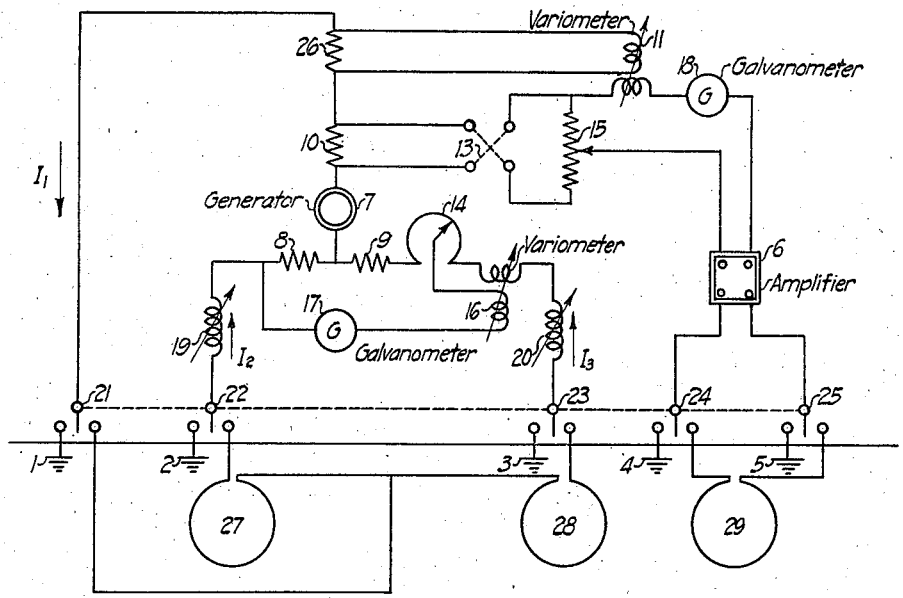

Referring to Fig. 1 a source of alternating current 7, such as a generator, and oscillator, etc., has one of its terminals connected to at least one electrode 1, while its other terminal is connected to at least two electrodes 2 and 3. 4 and 5 are potential electrodes placed at suitable points in contact with the ground to determine potential differences generated by the currents flowing between electrode 1 and electrodes 2 and 3. Switches 21, 22, 23, 24 and 25, serving to connect the current electrodes to the source of current, and the potential electrodes to the measuring apparatus, may be mechanically combined into a five-pole double-throw switch. When this switch is thrown to the left, the electrical circuit comprises, as stated above, the five electrodes 1, 2, 3, 4 and 5. When the switch is thrown to the right, the electrical circuit comprises the two current loops 27 and 28 and the potential loop 29. Since the present invention can equally well be used in conjunction with electrodes or with loops, the following description will be made, for the sake of simplicity, mainly with reference to the use of electrodes.

The electrode 1 is connected to one of the terminals of the current generator 7 through fixed shunt resistances 26 and 10.

Electrodes 2 and 3 are respectively connected to the other terminal of the current generator through variable impedances 19 and 20, by means of which the ratio of the currents flowing through electrodes 2 and 3 may be adjusted to any desired value, and through fixed resistances 8 and 9. A sensitive galvanometer 17 is connected across the resistances 8 and 9, and comprises in its circuit a slide wire resistance 14 and a variometer 16, by means of which the ratio of the currents and the phase angle between the currents flowing through the electrodes 2 and 3 may be accurately measured.

The potential electrodes 4 and 5 are connected to an amplifier 6, comprising in preferred form a vacuum tube drawing practically no current from the ground, followed by one or more transformer coupled amplification stages. The last amplification stage is connected to a potentiometer arrangement comprising a slide wire resistance 15, a variometer 11 and a sensitive galvanometer 18. One of the windings of the variometer 11 is connected across the fixed shunt resistance 26 in the circuit of the generator 7. The slide wire resistance 15 is connected across the fixed shunt resistance 10 by means of a reversing double-throw switch 13.

In operation, the total current through the ground ($I_1$) is sent from (or to) electrode 1, partly to (or from) electrode 2 ($I_2$), and partly to (or from) electrode 3 ($I_3$). The ratio of the current stream $I_2$ to the current stream $I_3$ may be varied by varying the impedances 19 and 20, and may be measured by adjusting the slide wire resistance 14 and the variometer 16 until the sensitive galvanometer 17 shows no deflection.

These currents produce in the ground a field which generates a potential difference between the potential electrodes 4 and 5. This potential difference is amplified by the amplifier 6, and is then balanced, by means of the slide-wire potentiometer 15, the variometer 11, and the sensitive galvanometer 18, against the potential drop due to the flow of a fraction of the total current $I_1$ through the resistance 15. The variable mutual inductance of the variometer 11 serves to compensate for the out-of-phase component of the impressed potential.

The amplifying power and the phase shift introduced by the amplifier 6 being known by previous calibration, this measurement makes it possible to determine, in well known manner, the potential difference between the electrodes 4 and 5 as a fraction of the total current $I_1$, as well as the phase angle between said potential difference and the total current.

It has already been shown in my co-pending application, Serial Number 133,804, filed March 30, 1937, that if two non-crossing current streams $I_2$ and $I_3$ are passed through the ground between three electrodes connected to the same source of current, the depth of maximum current density in the ground may be varied within very wide limits (theoretically from zero to infinity). In other words, the depth of maximum current density may be adjusted to practically any predetermined depth by varying the ratio $I_2/I_3$ of the current streams. Since the magnitude of the potential difference between potential electrodes 4 and 5 depends on the distribution of the current in the ground, it follows that the potential difference between electrodes 4 and 5 may be made to vary as a function of the current ratio $I_2/I_3$.

The procedure described above permits therefore to obtain the ratio of the potential difference between the electrodes 4 and 5 to the total current $I_1$ as a function of the current ratio $I_2/I_3$. From the behavior of this function useful deductions may be drawn concerning the electrical properties of the ground under exploration.

The arrangement of electrodes is arbitrary. For practical purposes, however, it is convenient to adopt a straight line arrangement in which all five electrodes are equidistant.

It may also be noted that, since the electrode arrangement is arbitrary, the electrode connections may be interchanged in such a manner, that, for example, 1 and 2 become potential electrodes, and 3, 4 and 5 become current electrodes. As will be easily seen, the five electrodes shown in Fig. 1 can be arranged in ten different combinations, whereby ten different sets of measurements may be obtained, without actually moving the electrodes. Although these different measurements generally refer to different depths, they are not altogether independent. A number of check relations exist between them, giving to a competent operator a valuable check on the accuracy of the observations.

When the switches 21, 22, 23, 24, and 25 of Fig. 1 are thrown to the right, the current comprises the two current-carrying loops 27 and 28 and the so-called probe loop 29. The alternating current flowing through the loops 27 and 28 sets up a field which induces eddy currents in the ground. The potential picked up by the probe loop 29 is dependent on the electrical properties of the ground, and can be measured as a function of the current ratio $I_2/I_3$, in the same manner as when using grounded electrodes.

In order to survey a tract or profile of considerable extension, the electrodes may be gradually moved along said tract, their spacing being preferably kept constant. After each change of location of one or more electrodes in the ground, check measurements may be effected by interchanging the electrode connections, as described above. If an anomaly in the horizontal homogeneous properties of the ground due to a fault, an ore deposit, etc., occurs within the stretch between electrodes 1 and 5, it becomes possible, by using first the electrodes 1, 2 and 3, and then electrodes 3, 4 and 5 as current electrodes, to flood the ground with current first on one side, and then on the other side of said anomaly, and to determine its location as described, for example, in Patent No. 1,934,079 to Lundberg. Since the present method provides a means for controlling the effective penetration of the current in the ground, the vertical extent of such anomaly can also be accurately determined.

For many purposes the following simplified procedure may be followed:

The current ratio is adjusted to such a value that the potential difference between the potential electrodes 4 and 5 would be zero for a uniform and homogeneous ground. This ratio may be easily determined from the following known equations:

$$I_2+I_3=I_1 \text{ and } \frac{I_1}{r_{14}}-\frac{I_1}{r_{15}}-\frac{I_2}{r_{24}}+\frac{I_2}{r_{25}}-\frac{I_3}{r_{34}}+\frac{I_3}{r_{35}}=0$$

wherein:

$r_{14}$ is the distance between electrodes 1 and 4
$r_{15}$ is the distance between electrodes 1 and 5
$r_{24}$ is the distance between electrodes 2 and 4
$r_{25}$ is the distance between electrodes 2 and 5
$r_{34}$ is the distance between electrodes 3 and 4
$r_{35}$ is the distance between electrodes 3 and 5

Since, by adjusting the intensities of the currents $I_1$, $I_2$ and $I_3$ in such a manner as to satisfy the above equations, the potential difference between the electrodes 4 and 5 is theoretically made to equal zero for a uniform and homogeneous ground, any observed potential difference between these electrodes can obviously be due only to departures from perfect uniformity of the ground, and the effect of such departures may be measured directly by this method.

It will be noted that if this method is adopted, and if the electrode spacings are kept in the same ratio, the potentiometer 14 and the variometer 16 may be dispensed with.

Figure 2:
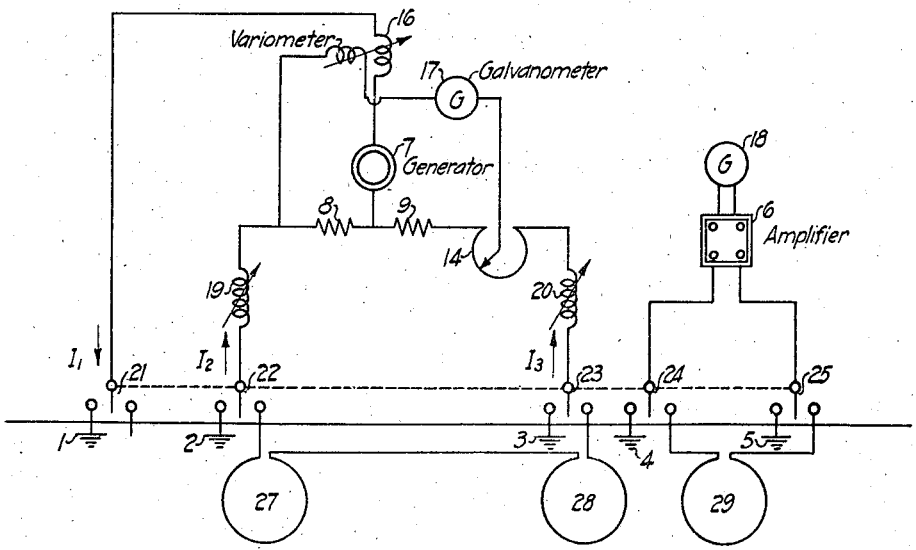
Fig. 2 illustrates a preferred simplified arrangement of apparatus for carrying out the same process in which, however, the potential generated in the ground is read directly.

Fig. 2, in which the same numerals are used to denote the same parts as in Fig. 1, gives a diagram of a simplified arrangement of apparatus which may be preferred in some cases. It is generally similar to that of Fig. 1, except that the means for balancing the potential difference between the electrodes 4 and 5 against a portion of the voltage in the circuit of electrodes 1, 2 and 3 (namely, the shunt resistances 10 and 26, double-throw switch 13, potentiometer 15 and variometer 11) are omitted. The variometer 16 is shown in Fig. 2 connected in an alternative manner which gives it a somewhat greater range, although the arrangement of Fig. 1 can be equally well used.

Null measurements may be effected by means of the apparatus shown in Fig. 2 in the following manner:

The switches 21, 22, 23, 24 and 25 can all be thrown either into the left-hand or the right-hand position, whereby the grounded electrodes 1, 2, 3, 4 and 5, or the loops 27, 28 and 29 may be connected into the electric circuit. By means of the variable impedances 19 and/or 20, the current ratio $I_2/I_3$ is then adjusted until the galvanometer 18 shows no deflection, that is, until no potential difference exists between the electrodes 4 and 5. The current ratio required to accomplish this result is measured by adjusting the potentiometer 14 and the variometer 16, until the galvanometer 17 shows no deflection (null method of measurement).

It will be noted that with the method of measurement illustrated in Fig. 2 it is possible to use direct current instead of alternating current when the circuit comprises the grounded electrodes 1, 2, 3, 4 and 5, that is, the A. C. generator 7 may be replaced by a battery, a D. C. generator, or a generator of interrupted direct current. The variometer 16 and the amplifier 6 may then be dispensed with. The galvanometer 18 in this case should preferably be of the sensitive type responding only to direct current.

As before, the arrangement of electrodes or loops is arbitrary, a straight line arrangement of electrodes, and a concentric arrangement of loops being, however, often preferable for practical purposes.

Figure 3:
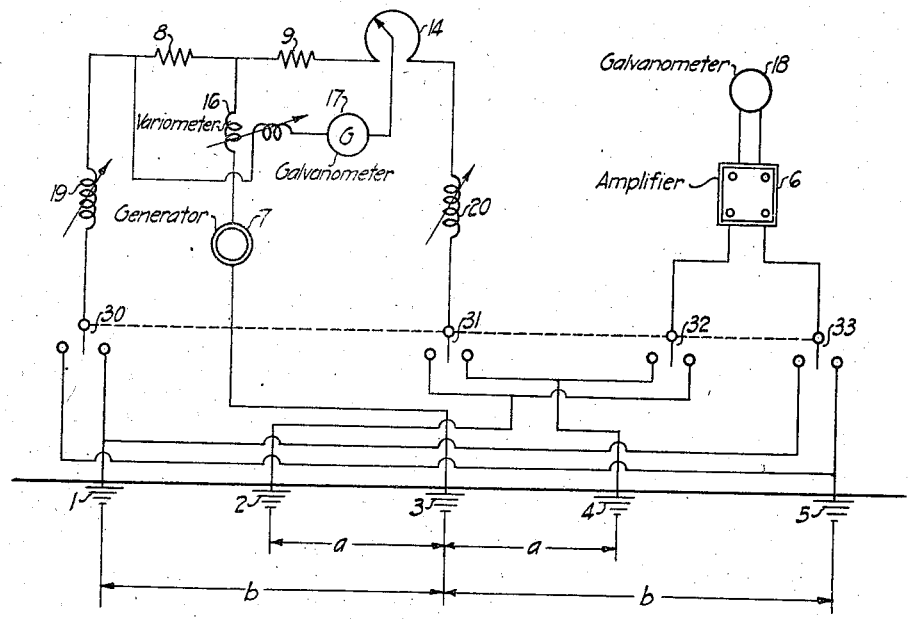
Fig. 3 illustrates an arrangement of apparatus whereby current and potential electrodes may be interchanged in the circuits without changing their location in the ground.

Fig. 3 illustrates a switch arrangement whereby any electrodes may be interchanged in the circuits, and several sets of readings obtained without changing the actual location of the electrodes in the ground. This figure illustrates diagrammatically a symmetric straight line arrangement of electrodes in which 30, 31, 32 and 33 are switches which may be mechanically connected to form a four-pole double-throw switch. The same numerals are used to denote the same parts as in Figs. 1 and 2. An equidistant electrode spacing in which $C=2a$, as shown on the drawings, is convenient for practical purposes, but is not essential for the method.

When the switches 30, 31, 32 and 33 are thrown to the left, 2, 3 and 5 are current electrodes, and 1 and 4 are potential electrodes. When the switches are thrown to the right, 1, 3 and 4 are current electrodes and 2 and 5 are potential electrodes. If the electrical properties of the ground change only in the vertical direction, the measurements, carried out as previously described in connection with Fig. 2, would give the same results in both cases. Any departure from equal values in the corresponding quantities measured is therefore an indication of a change in the electrical properties of the ground in a horizontal direction, and the difference in the results obtained is a measure of this horizontal change. The average of the values obtained in the two measurements, on the other hand, is an indication of the change of the electrical properties of the ground in the vertical direction. In this way, the effect of vertical changes is separated from the effect of horizontal changes in the ground. A similar switch arrangement may be used to interchange the other electrodes in the circuits in any desired manner.

In describing the method of the present invention, illustrated in Figs. 1, 2 and 3, reference has been made, for the sake of simplicity, to circuits comprising either three loops, or five grounded electrodes (3 current and 2 potential electrodes). It is obvious that in order to obtain more comprehensive results, not only the spacing between electrodes, or the circumference of the loops may be varied, but a greater number of electrodes or loops may be included in the circuits.

Figure 4:
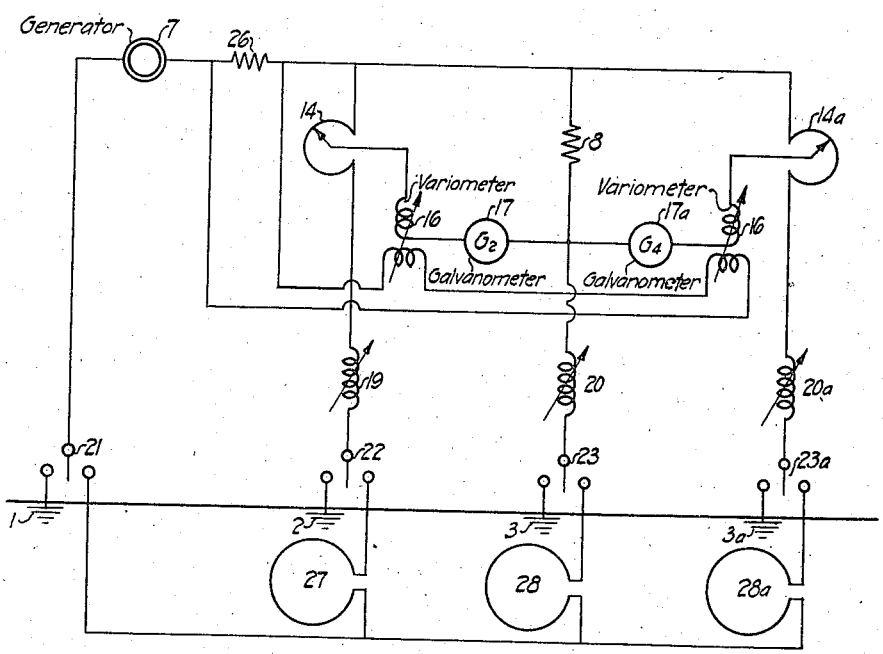
Fig. 4 illustrates an arrangement of apparatus wherein more than three current electrodes or two loops are connected to the same source of current. The potential or exploring electrodes or loops circuit used with this arrangement is not shown, being the same as in Fig. 2.

Fig. 4 illustrates diagrammatically a preferred form of circuit to be used, for example, when more than three current electrodes, or more than two current-carrying loops are used. The circuit of the potential electrodes is the same as for Fig. 2 and has been omitted in Fig. 4. Theoretical considerations pertaining to the use of more than three current electrodes connected to the same source of electric current are discussed in my previous patent application, Serial Number 133,804, filed March 30, 1937.

It is well known that the penetration of the current into the ground, depends in a characteristic manner on the frequency of the current used, owing to various reasons, such, for example, as the so-called skin effect.

This fact may be used to advantage in carrying out measurements by the present method. The frequency of the current sent into the ground may be varied, and the measurements repeated for different frequencies. In this manner, an additional control over the effective depth of penetration of the current into the ground may be obtained, and the frequency characteristics of the ground may be investigated.

The ground, being largely an electrolytic conductor, cannot in general be expected to obey Ohm's law. In other words, the resistivity and other electrical properties of the ground will depend to some extent on the current density. By controlling, according to the method of the present invention, the effective penetration of the current into the ground, and by repeating measurements with varying total intensities of the current, the manner in which the various formations depart from Ohm's law may be determined, and the characteristic properties of said formations identified.

The present method, as has been pointed out above, may be used with direct current, or with any desired frequencies of alternating current, for example, frequencies of from 40 to approximately 1 cycle per second. Low frequencies, such as 1 cycle per second or less are especially desirable. Commutation devices may be advantageously used to generate these low frequencies.

It is understood that any desired auxiliary apparatus, such as oscillographs, galvanometer strings, etc., may be connected in known manner in the circuit of the potential electrodes or loops in order to investigate and analyze the characteristics of the current flowing in said circuit, in a manner generally similar to that disclosed in my previous application, Serial Number 133,804, filed March 30, 1937.

I claim as my invention:

1. In a method of geophysical exploration, the steps of forcing an electric current from a single electromotive source to flow through the ground in a plurality of streams through a plurality of current electrodes, varying the relative intensities of said current streams, registering said relative intensities and measuring the potential difference generated by the flow of said streams between two grounded potential electrodes for different intensities of said streams.

2. In a method of geophysical exploration, the steps of forcing an exciter current from a single electromotive source to flow through the ground in a plurality of streams through a plurality of current electrodes, varying the relative intensities of said streams, registering said relative intensities and measuring the potential difference generated between two grounded potential electrodes by the flow of said streams by balancing said potential difference against a potential drop created by passing a known fraction of the total exciter current through a known impedance.

3. In a method of geophysical exploration the steps of placing in contact with the ground at predetermined fixed locations at least three current electrodes connected to the same electromotive source, and at least two potential electrodes connected to a potential measuring device, adjusting the relative intensities of the current streams flowing through the current electrodes to such calculated values that no potential difference would be generated by said streams between the potential electrodes in a uniform and homogeneous ground for said predetermined fixed arrangement of electrodes, and determining the departure of the ground from a uniform and homogeneous distribution by registering the potential difference generated between the potential electrodes when said streams flow through the current electrodes.

4. In a method of geophysical exploration, the steps of generating electric currents in the ground by means of at least two parallel exciter circuits connected to the same source of electromotive force, causing said ground currents to generate a potential difference in at least one exploring circuit, measuring said potential difference, adjusting the ratio of current intensities in the parallel exciter circuits until no potential difference is generated in the exploring circuit, and recording said ratio.

5. In a method of geophysical exploration, the steps of forcing an electric current from a single electromotive source to flow through the ground in a plurality of streams through a plurality of current electrodes, measuring the potential difference generated between two grounded potential electrodes by the flow of said streams, adjusting the ratio of current intensities in said streams until no potential difference is generated between the potential electrodes, and recording said ratio.

6. In a method of geophysical exploration, the steps of forcing an electric current from a single electromotive source to flow through the ground in a plurality of streams through a plurality of current electrodes, measuring the potential difference generated by the flow of said streams between two grounded potential electrodes, adjusting the ratio of current intensities in said streams until no potential difference is generated between the potential electrodes, recording said ratio, and repeating the process for a different total intensity of the current flowing through the current electrodes.

7. In a method of geophysical exploration, the steps of forcing an electric current from a single electromotive source to flow through the ground in a plurality of streams through a plurality of current electrodes, measuring the potential difference generated by the flow of said streams between two grounded potential electrodes, adjusting the ratio of current intensities in said streams until no potential difference is generated between the potential electrodes, recording said ratio, and repeating the process for a different frequency of the current flowing through the current electrodes.

8. In a method of geophysical exploration, the steps of forcing an electric current from a single electromotive source to flow through the ground in a plurality of streams through a plurality of current electrodes, measuring the potential difference generated by the flow of said streams between two grounded potential electrodes, adjusting the ratio of current intensities in said streams until no potential difference is generated between the potential electrodes, recording said ratio, interchanging the circuit connections of at least one current and of at least one potential electrode, and repeating the process.

9. In a method of geophysical exploration, the steps of generating a potential difference in the ground by passing currents through a plurality of parallel exciter circuits connected to a single electromotive source, varying the relative intensities of said currents, registering said relative intensities, and measuring by means of an exploratory circuit the potential differences generated in the ground by the flow of said currents for different relative intensities thereof.

10. In a method of geophysical exploration, the steps of forcing an electric current from a single electromotive source to flow through the ground in a plurality of streams through a plurality of current electrodes, varying the relative intensities of said current streams, registering said relative intensities, and measuring the potential difference generated by the flow of said streams between two grounded potential electrodes for different intensities of said streams, by balancing said potential difference against a known potential difference.

11. In a method of geophysical exploration, the steps of generating electric currents in the ground by means of at least two parallel exciter circuits connected to the same source of electromotive force, causing said ground currents to generate a potential difference in at least one exploring circuit, measuring said potential difference by impressing on the exploring circuit a balancing potential and adjusting the ratio of current intensities in the parallel exciter circuits until no potential difference is indicated in the exploring circuit, and recording said ratio.

HAAKON MUUS EVJEN.